(12) United States Patent
Nakamura et al.

(10) Patent No.: US 8,778,261 B2
(45) Date of Patent: Jul. 15, 2014

(54) STEEL MATERIAL FOR AUTOMOBILE CHASSIS PARTS SUPERIOR IN FATIGUE CHARACTERISTICS AND METHOD OF PRODUCTION OF AUTOMOBILE CHASSIS PARTS USING THE SAME

(75) Inventors: Hideyuki Nakamura, Tokyo (JP); Isao Anai, Tokyo (JP); Yasushi Yamamoto, Tokyo (JP); Takaaki Fukushi, Tokyo (JP); Izuru Yamamoto, Toyota (JP); Masaaki Kondo, Nagoya (JP); Satoru Shimazu, Nisshin (JP)

(73) Assignees: Nippon Steel & Sumitomo Metal Corporation, Tokyo (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/300,970

(22) Filed: Nov. 21, 2011

(65) Prior Publication Data

US 2012/0093678 A1 Apr. 19, 2012

Related U.S. Application Data

(62) Division of application No. 12/310,033, filed as application No. PCT/JP2007/065893 on Aug. 8, 2007.

(30) Foreign Application Priority Data

Aug. 11, 2006 (JP) .................................. 2006-219737
Jul. 30, 2007 (JP) ................................. 2007-197348

(51) Int. Cl.
 *C22C 38/12* (2006.01)
(52) U.S. Cl.
 USPC ............................ 420/124; 420/127; 148/328

(58) Field of Classification Search
 USPC .................. 420/124, 120, 123, 127; 148/328
 See application file for complete search history.

(56) References Cited

U.S. PATENT DOCUMENTS

| | | | |
|---|---|---|---|
| 6,487,886 B2 * | 12/2002 | Ueno et al. ......................... | 72/57 |
| 2003/0063996 A1 | 4/2003 | Funakawa et al. | |
| 2003/0180174 A1 * | 9/2003 | Ishikawa et al. ............... | 420/124 |
| 2006/0124211 A1 * | 6/2006 | Takano et al. ................. | 148/593 |

FOREIGN PATENT DOCUMENTS

| | | |
|---|---|---|
| CN | 10104857 | 10/2007 |
| EP | 1 026 274 | 8/2000 |
| EP | 1 676 932 | 7/2006 |
| EP | 1816227 | 8/2007 |
| JP | 4-141547 | 5/1992 |
| JP | 5-117802 | 5/1993 |
| JP | 5-117803 | 5/1993 |
| JP | 05117802 A * | 5/1993 |
| JP | 5-195075 | 8/1993 |
| JP | 11-80882 | 3/1999 |
| JP | 2000-234153 | 8/2000 |
| JP | 2001-131703 | 5/2001 |
| JP | 2001-321846 | 11/2001 |

(Continued)

*Primary Examiner* — Roy King
*Assistant Examiner* — Janelle Morillo
(74) *Attorney, Agent, or Firm* — Kenyon & Kenyon LLP (57) ABSTRACT

The present invention provides a steel material for automobile chassis parts, having high fatigue characteristics, without a heat treatment, and superior shapeability, and a method of production of such automobile chassis parts. The surface of the steel has a high hardness and the center has a low hardness, providing the superior characteristics. With an annealing step of the invention, it is possible to relieve internal stress and further improve fatigue characteristics.

9 Claims, 5 Drawing Sheets

(56) References Cited

FOREIGN PATENT DOCUMENTS

| | | |
|---|---|---|
| JP | 2004-204315 | 7/2004 |
| JP | 2004-315959 | 11/2004 |
| JP | 2005-264240 | 9/2005 |
| JP | 2005-290485 | 10/2005 |
| JP | 2005-298957 | 10/2005 |
| WO | WO 2005/056856 | 6/2005 |
| WO | WO 2005056856 A1 * | 6/2005 |
| WO | WO 2006/011503 | 2/2006 |

* cited by examiner

A-A CROSS-SECTION

B-B CROSS-SECTION

STEEL MATERIAL FOR AUTOMOBILE CHASSIS PARTS SUPERIOR IN FATIGUE CHARACTERISTICS AND METHOD OF PRODUCTION OF AUTOMOBILE CHASSIS PARTS USING THE SAME

RELATED APPLICATIONS

This application is a division of co-pending U.S. patent application Ser. No. 12/310,033, filed Mar. 17, 2009, national stage application of International Application No. PCT/JP2007/065893, filed Aug. 8, 2007, which claims priority to Japanese Application No. 2006-219737, filed Aug. 11, 2006 and Japanese Application No. 2007-197348, filed Jul. 30, 2007, each of which is incorporated by reference in its entirety.

TECHNICAL FIELD

The present invention relates to a steel material for automobile chassis parts superior in fatigue characteristics and a method of production of automobile chassis parts using the same.

BACKGROUND ART

The axle beam arranged between left and right wheels of an automobile, the surrounding suspension members, and other automobile chassis parts are repeatedly subjected to an impact load, torsion load, etc. during vehicle operation, so a high strength and also high fatigue characteristics are required. For example, Japanese Patent Publication (A) No. 2001-321846 discloses a hollow structure axle beam obtained by press forming high strength steel pipe into an irregular cross-sectional shape.

The axle beam of this Japanese Patent Publication (A) No. 2001-321846 is improved in fatigue characteristics by press forming high strength steel pipe into an irregular cross-sectional shape, then heating it to a high temperature and then rapidly water cooling it for quenching. For this, however, it is necessary to heat this to a high temperature of the transformation point of the steel material or more, so the heating cost rises and, on top of this, control of the atmosphere is required for preventing oxidation scale or a descaling step is required, so there was the problem that the cost became further higher. Further, in general, high strength steel pipe is poor in shapeability and easily varies in dimensions, so there was the problem that the work efficiency in assembly into the chassis fell.

Note that in the process of production of chassis parts of irregular cross-sections such as an axle beam, the material, that is, the steel pipe, is subjected to strong bending, so the bent parts suffer from large residual stress. Therefore, in the past, when not quenching the material, the residual stress resulted in lower fatigue characteristics. Further, if performing stress-relief annealing to remove the residual stress, there was the problem that the steel material ended up softening, so again the necessary fatigue characteristics could not be secured.

DISCLOSURE OF THE INVENTION

An object of the present invention is to solve the above conventional problems and provide a steel material for automobile chassis parts superior in fatigue characteristics which has high fatigue characteristics regardless of the shapeability being excellent and further not requiring much cost for heat treatment and a method of production of automobile chassis parts using the same.

The steel material for automobile chassis parts superior in fatigue characteristics of claim 1 made to solve the above problems is characterized by being a steel material to which Nb and Mo have been compositely added and having a difference 50 to 150 points between a Vicker's hardness of the center of plate thickness and a maximum value of Vicker's hardness within 0.5 mm from the surface after bending by a bending R of the plate outer surface of 2 to 5 times the plate thickness.

Further, the steel material for automobile chassis parts superior in fatigue characteristics of claim 2 made for solving the same problems is characterized by being a steel material to which Nb and Mo have been compositely added and having a difference 50 to 150 points between a Vicker's hardness of the center of plate thickness and a maximum value of Vicker's hardness within 0.5 mm from the surface after bending by a bending R of the plate outer surface of 2 to 5 times the plate thickness, then annealing under conditions giving a tempering parameter $\lambda$, defined by $\lambda=T(20+\log(t))$, of 14000 to 19000 (where T is an absolute temperature, t is a time (h), and the temperature rise is 660° C.).

The aspect of the invention of claim 3 limits the composition of the steel material for automobile chassis parts set forth in claim 1 or 2 and is characterized by having a composition of, by mass %, C: 0.05 to 0.23%, Si: 0.05 to 1.0%, Mn: 0.3 to 2.0%, P: 0.03% or less, S: 0.01% or less, Nb: 0.01 to 0.1%, Mo: 0.1 to 0.5%, Sol. Al: 0.01 to 0.05%, N: 0.006% or less, and the balance of Fe.

The aspect of the invention of claim 4 is characterized by comprising the composition of the steel material as set forth in claim 3 further including at least one of Ti: 0.005 to 0.03%, V: 0.005 to 0.1%, Cr: 0.1 to 0.5%, Cu: 0.001 to 0.5%, Ni: 0.001 to 0.5%, B: 0.0001 to 0.003%, Ca: 0.0001 to 0.003%, and Mg: 0.0001 to 0.004%.

Claim 5 and on are aspects of an invention of a method of production of an automobile chassis part superior in fatigue characteristics after shaping and annealing. The aspect of the invention of claim 5 is characterized by bending a steel material having a composition of, by mass %, C: 0.05 to 0.23%, Si: 0.05 to 1.0%, Mn: 0.3 to 2.0%, P: 0.03% or less, S: 0.01% or less, Nb: 0.01 to 0.1%, Mo: 0.1 to 0.5%, Sol. Al: 0.01 to 0.05%, N: 0.006% or less, and the balance of Fe to give a bending R of the outer surface of the plate of 2 to 5 times the plate thickness and making the difference between the Vicker's hardness of the plate thickness center and the maximum value of the Vicker's hardness within 0.5 mm from the surface 50 to 150 points.

Further, the aspect of the invention of claim 6 is characterized by bending a steel material having a composition of, by mass %, C: 0.05 to 0.23%, Si: 0.05 to 1.0%, Mn: 0.3 to 2.0%, P: 0.03% or less, S: 0.01% or less, Nb: 0.01 to 0.1%, Mo: 0.1 to 0.5%, Sol. Al: 0.01 to 0.05%, N: 0.006% or less, and the balance of Fe to give a bending R of the plate outer surface of 2 to 5 times the plate thickness, then annealing it under conditions giving a tempering parameter $\lambda$ defined by $\lambda=T(20+\log(t))$ of 14000 to 19000 (where T is an absolute temperature, t is a time (h), and the temperature rise is 660° C.), and making the difference between the Vicker's hardness of the plate thickness center and the maximum value of the Vicker's hardness within 0.5 mm from the surface 50 to 150 points.

The aspects of the invention of claim 7 and claim 8 are characterized by further including in the compositions of steel materials of claims 5 and 6 one or more of Ti: 0.005 to 0.03%, V: 0.005 to 0.1%, Cr: 0.1 to 0.5%, Cu: 0.001 to 0.5%, Ni: 0.001 to 0.5%, B: 0.0001 to 0.003%, Ca: 0.0001 to 0.003%, and Mg: 0.0001 to 0.004%.

BEST MODE FOR CARRYING OUT THE INVENTION

The steel material for automobile chassis parts of the present invention is a precipitation hardening type of steel material to which Nb and Mo are compositely added, specifically, one having a composition of, by mass %, C: 0.05 to 0.23%, Si: 0.05 to 1.0%, Mn: 0.3 to 2.0%, P: 0.03% or less, S: 0.01% or less, Nb: 0.01 to 0.1%, Mo: 0.1 to 0.5%, Sol. Al: 0.01 to 0.05%, N: 0.006% or less, and the balance of Fe.

Nb and Mo are important elements for causing work hardening and improving the strength and hardness without causing the metal structure of the surface layer to coarsen when bending giving a bending R of the plate outer surface of 2 to 5 times the plate thickness and, when annealed, precipitating as (Nb,Mo)C upon heating to improve the strength and hardness. To enable this effect to be manifested, Nb has to be added in an amount of 0.01% or more and Mo in 0.1% or more. Nb has a remarkable effect when added in a small amount and is an expensive element, so due to the cost restrictions, the upper limit was made 0.1%. Mo suffers from similar cost restrictions as Nb and also results in deterioration of the workability if added in a large amount, so the upper limit was made 0.5%.

C was made 0.05% or more to obtain a high strength, but if over 0.23%, the toughness falls and the fatigue characteristics are affected, so the content was made 0.05 to 0.23% in range. Si is effective as a deoxidizing element if included in an amount of 0.05% or more, but if excessively added, formation of defects due to $SiO_2$ is invited at the time of seam welding, so the content was made 0.05 to 1.0% in range. Mn also has to be included in an amount of 0.3% or more to obtain a high strength, but if over 2.0%, defects due to MnO are invited, so the content was made 0.3 to 2.0% in range. P: 0.03% or less and S: 0.01% or less are similar to the ingredients of usual seam-welded steel pipe.

Sol. Al and N are elements for forming AN and promoting the increased fineness of the crystals. If Al is less than 0.01%, the effect is insufficient, while even if Al is over 0.05% or N is over 0.006%, a commensurate effect cannot be obtained, so the ranges were made similar to those of ingredients of usual seam-welded steel pipe.

Note that by further selectively adding to the above basic steel composition Ti: 0.005 to 0.03%, V: 0.005 to 0.1%, Cr: 0.1 to 0.5%, Cu: 0.001 to 0.5%, Ni: 0.001 to 0.5%, B: 0.0001 to 0.003%, Ca: 0.0001 to 0.003%, and Mg: 0.0001 to 0.004%, more preferable characteristics can be obtained.

Ti is an element for improving the toughness, while V and Cr are elements for assisting suppression of softening due to annealing. Cu is an element for improving strength, while Ni is an element for improving toughness. B is an element for improving strength, while Ca is an element for controlling the form of the oxides and suppressing the formation of MnS. These properties are exhibited in the above ranges set for the different elements. If below the lower limits, the effects are not manifested, while even if over the upper limits, the effects are saturated. Note that Mg is an element for increasing the fineness of the crystal grains and improving the bendability and for suppressing the formation of MnS and improving the toughness of the seam part. For this reason, 0.0001% or more is required, but inclusion over 0.004% is not easy.

Figure 1:
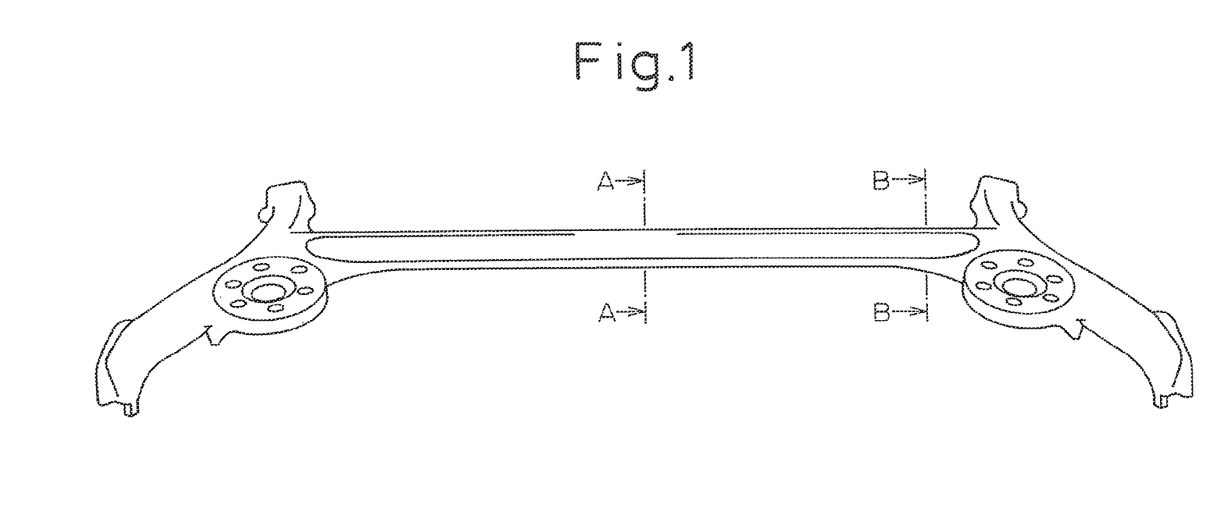
FIG. 1 is a perspective view showing an axle beam of an embodiment.
Figure 2:
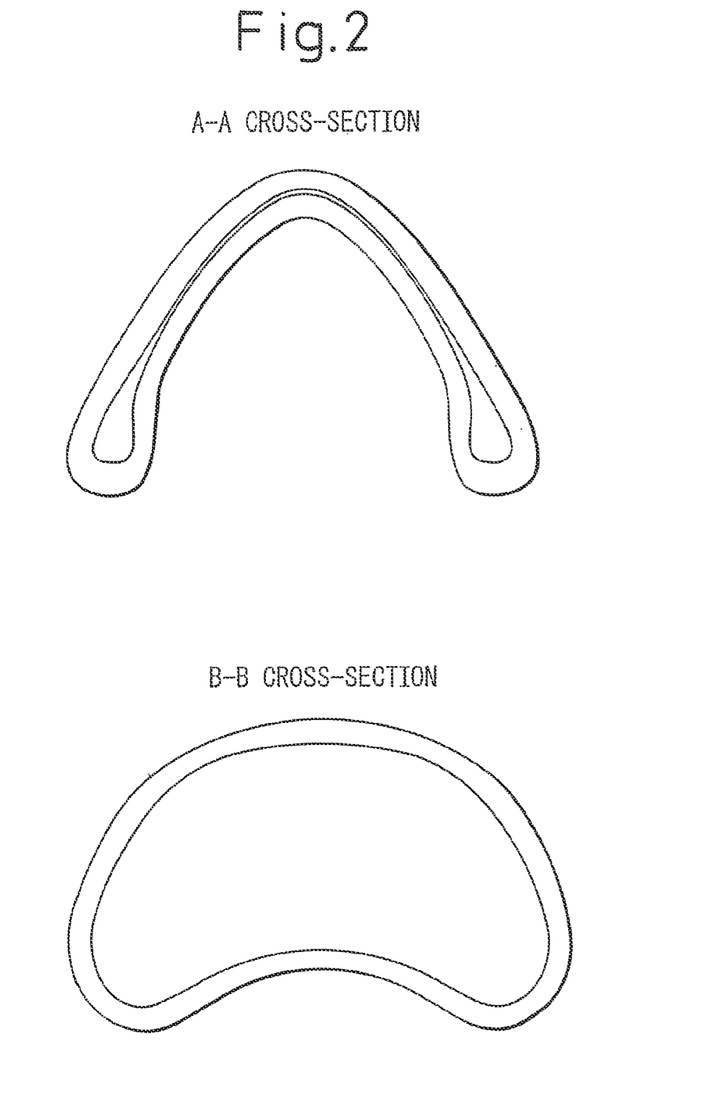
FIG. 2 is a cross-sectional view along the line A-A, B-B of the axle beam of the embodiment of FIG. 1.

In the present invention, a steel material of the above composition is used to produce steel pipe. This is press formed to give a cross-sectional shape as shown in for example FIG. 1 and FIG. 2 and produce an axle beam or other automobile chassis part. The steel pipe is produced by the usually seam welding. The axle beam of this embodiment, as illustrated, has a cross-sectional shape close to a circle at the two ends, but is strongly bent at the center giving a bending R of the plate outer surface of 2 to 5 times the plate thickness. This type of bending causes work hardening, but while the surface layer rises in hardness, the rise in hardness near the plate center thickness forming the neutral axis at the time of bending is only slight. Note that bending giving a bending R of the outer surface of the plate of less than 2 times the plate thickness is difficult, while if over 5 times, the rise in hardness due to the work hardening becomes insufficient, so bending giving a bending R of the outer surface of the plate of 2 to 5 times the plate thickness is essential.

Figure 3:
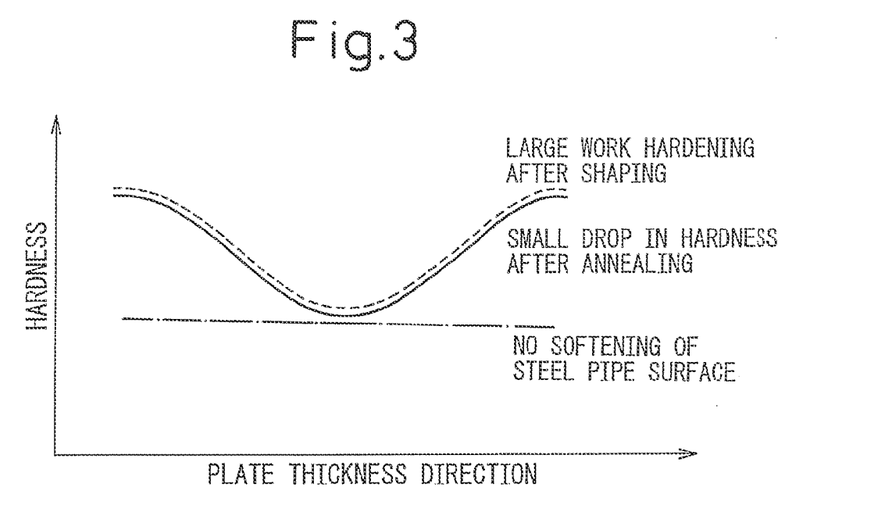
FIG. 3 is a graph showing the change in hardness in the plate thickness direction of the steel material of the present invention.

FIG. 3 is a view schematically showing the hardness in the plate thickness direction in the steel material for automobile chassis parts of the present invention. In the state of the material, that is, the seam-welded steel pipe, the surface hardness is of a level shown by the one-dot chain line. However, due to the above bending, as shown by the broken line, the hardness of the surface layer greatly rises. In this way, the steel material of the present invention has large work hardening. At this stage, a large difference in hardness occurs between the surface layer part and the plate thickness center part. Further, in the steel material of the present invention, coarsening of the crystal structure of the surface layer where work hardening occurs can be suppressed and a denser structure can be maintained.

For this reason, automobile chassis parts produced using the steel material for automobile chassis parts of the present invention, as shown by the data of the later explained examples, are superior in fatigue characteristics and free from cracks formed from the surface.

Further, to ease the internal residual stress accompanying working and further improve the fatigue characteristics, the steel material for automobile chassis parts of the present invention may also be annealed. The annealing conditions in this case can be expressed by a tempering parameter λ defined in the industry by the known λ=T(20+log(t)). The steel material for automobile chassis parts of the present invention can be eased in internal residual stress by annealing under conditions where λ becomes 14000 to 19000 (where T is the absolute temperature, t indicates the time (h), and the temperature rise is 660° C.). Note that if below the above range, the material gradually approaches the aspect of the invention of claim 1. It becomes insufficient in terms of easing of the residual stress and the meaning of the annealing drops. Conversely, if λ is above the above range, the strength and hardness fall and the fatigue characteristics deteriorate. Further, the heating cost also increases, so such annealing should be avoided.

Figure 4:
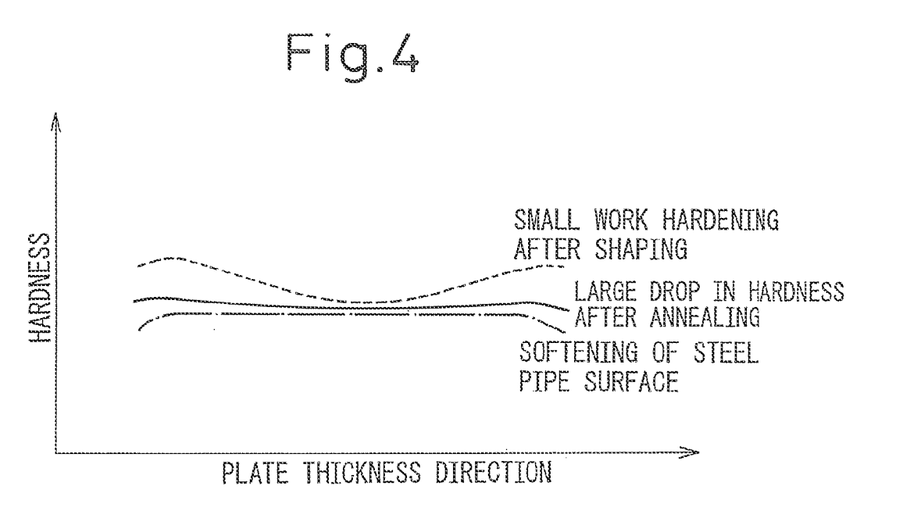
FIG. 4 is a graph showing the change in hardness in the plate thickness direction of a general steel material.

FIG. 4 is a schematic view similar to FIG. 3 for a general steel pipe. In the case of a general steel pipe, compared with the steel material of the present invention, the work hardening is also very slight. Further, it is shown that due to the annealing, the surface layer also softens and the majority of the hardness accompanying the work hardening is lost. As opposed to this, the steel material for automobile chassis parts of the present invention is a precipitation hardening type of steel material to which Nb and Mo are compositely added. The work hardening is large and the heating at the time of annealing causes precipitation of (Nb,Mo)C to improve strength and hardness, so as shown by the solid line in FIG. 3, there is almost no change in hardness along with annealing and the difference in hardness between the surface layer part and the plate thickness center part due to the bending work is maintained almost as it is.

As a result, the steel material of the present invention, both in the case of no annealing and in the case of annealing, has a difference between the Vicker's hardness of the plate thickness center and the maximum value of the Vicker's hardness within 0.5 mm from the surface of 50 to 150 points. Specifically, the Vicker's hardness of the plate thickness center is about 200 to 250, while the Vicker's hardness within 0.5 mm from the surface is 300 to 350 or so.

As explained above, in the steel material for automobile chassis parts of the present invention and the automobile chassis parts produced by the method of the present invention using a steel material, in the state where the necessary bending is performed, the center part is low in hardness so a superior shapeability is maintained, while the surface layer part has a high hardness, dense structure and exhibits superior fatigue characteristics. Further, by annealing the material to relieve internal stress, it is possible to exhibit further superior fatigue characteristics. Note that an Nb-Ti-based steel material suffers from coarsening of the crystal grains at the surface layer part at the time of annealing and cannot be given a large hardness difference like in the present invention. Further, cracks are liable to be formed from the surface layer part. Therefore, it is not preferable. Below, examples of the present invention will be shown.

In the above embodiments, an axle beam was shown as a typical example of an automobile chassis part, but the invention can be broadly applied to suspension parts and other chassis parts where fatigue characteristics are required of course.

EXAMPLE 1

Figure 5:
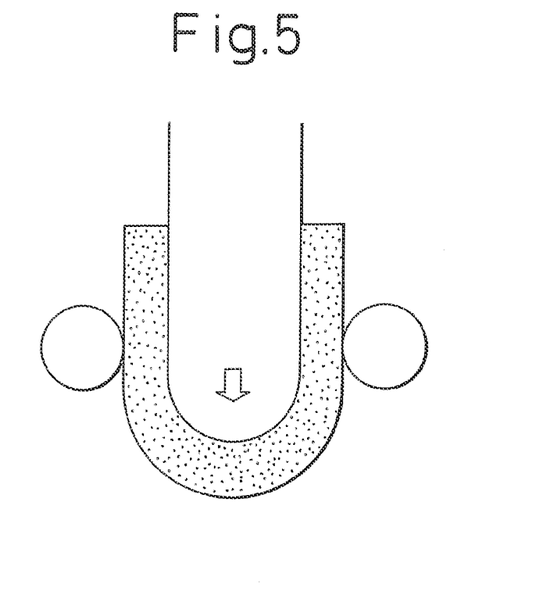
FIG. 5 is an explanatory view showing the bending by a 3-point bending press in Example 1.

Steel of each of the ingredients shown in Table 1 was formed into 30 kg steel ingots by a vacuum melting furnace. Next, each ingot was hot rolled to a plate thickness of 4.5 mm. The obtained steel plate was bent by a bending R shown in Table 1 by a 3-point bending press such as shown in FIG. 5 to obtain U-shaped fatigue test pieces. Some of the samples were annealed by stress-relief annealing at 580° C. for 30 min.

Figure 6:
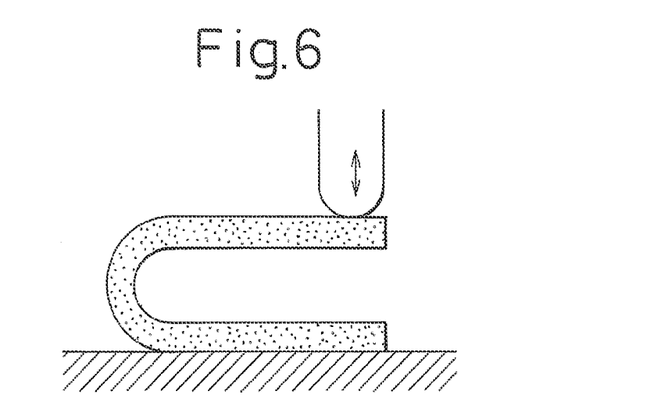
FIG. 6 is an explanatory view showing the state of a fatigue test in Example 1.

One end of each obtained sample was fixed to a table as shown in FIG. 6 and the other end was repeatedly pushed down for a fatigue test. Samples cracking at less than 50,000 cycles were indicated as "Poor", samples cracking 50,000 to less than 100,000 cycles as "Good", and samples not cracking at 100,000 cycles as "Very good" in Table 2. Further, the hardnesses at the plate thickness center and a position 0.4 mm from the bending surface were measured by a load 100 gf micro Vickers system. The difference ΔH is indicated in Table 2 as well.

TABLE 1

Chemical Composition of Tested Steel (mass %)

| No. | C | Si | Mn | P | S | Nb | Mo | Sol. Al | N |
|---|---|---|---|---|---|---|---|---|---|
| 1 | 0.06 | 0.05 | 0.5 | 0.018 | 0.005 | 0.07 | 0.2 | 0.02 | 0.003 |
| 2 | 0.09 | 0.15 | 1.6 | 0.015 | 0.003 | 0.03 | 0.3 | 0.03 | 0.002 |
| 3 | 0.20 | 0.25 | 1.4 | 0.012 | 0.002 | 0.03 | 0.3 | 0.03 | 0.002 |
| 4 | 0.20 | 0.25 | 1.4 | 0.012 | 0.002 | 0.03 | 0.3 | 0.03 | 0.002 |
| 5 | 0.03 | 0.25 | 1.6 | 0.013 | 0.004 | 0.02 | 0.2 | 0.03 | 0.003 |
| 6 | 0.25 | 0.30 | 1.8 | 0.015 | 0.005 | 0.04 | 0.4 | 0.02 | 0.004 |
| 7 | 0.08 | 0.25 | 1.6 | 0.012 | 0.003 | 0 | 0.2 | 0.03 | 0.004 |
| 8 | 0.12 | 0.20 | 1.3 | 0.013 | 0.004 | 0.04 | 0 | 0.03 | 0.002 |
| 9 | 0.06 | 0.25 | 1.5 | 0.011 | 0.001 | 0.02 | 0.15 | 0.04 | 0.003 |

TABLE 2

Bending R of Plate Outer Surface, Presence of Annealing, Results of Fatigue Test, and ΔHv of Test Piece

| No. | Bending R | Annealing | Fatigue test | ΔHv |
|---|---|---|---|---|
| 1 | 2.5 | None | Good | 140 |
| 2 | 4.0 | None | Good | 65 |
| 3 | 2.5 | None | Good | 115 |
| 4 | 2.5 | Yes | Very good | 110 |
| 5 | 4.0 | None | Poor | 40 |
| 6 | 2.5 | None | | Cracks |
| 7 | 4.0 | None | Poor | 30 |
| 8 | 2.5 | Yes | Poor | 40 |
| 9 | 6.0 | Yes | Poor | 35 |

As shown in Table 2, No. 1 to No. 4 had sufficiently large ΔHv's and also had good fatigue test results. In particular, No. 4 gave superior fatigue characteristics due to suitable annealing. No. 5 had a low C and a low hardness of the steel plate surface, so had a small ΔHv. No. 6 had a high C and could not be bent. This is believed to be because there were many carbides and the bending characteristics were degraded. No. 7 had a low Nb and No. 8 had a low Mo, so had a low ΔHv. This is believed because the steel plate surface became coarser in structure and softened, the surface hardness after bending was low, and the fatigue characteristics were also low. No. 9 had a gentle bending R and did not have a sufficiently high surface hardness, so was believed low in fatigue characteristics as well.

EXAMPLE 2

A steel material of 0.16% C-0.2% Si-1.3% Mn-0.04% Nb-0.35% Mo-and the balance of Fe was hot rolled to steel plate of a plate thickness of 3.0 mm, then was formed into a φ75.0 seam welded steel pipe and was press formed to give a bending R of the outer surface of 10 mm and annealed under different annealing conditions. The obtained samples were measured for residual stress by the X-ray method, Further the hardness at the plate thickness center in the cross-section and the hardness of a position 0.4 mm from the surface were measured by a micro Vickers system (load 100 gf) and the difference made ΔH. Further, a torsion fatigue test was run. Samples cracking at less than 50,000 cycles were indicated as "Poor", at 50,000 to less than 100,000 cycles as "Good", and 100,000 cycles or more as "Very good". The results are shown in Table 3.

TABLE 3

| No. | Annealing temperature | Holding time | Tempering parameter (λ) | Residual stress | ΔH | Fatigue test results |
|---|---|---|---|---|---|---|
| 1 | No annealing | | | 480 MPa | 90 | Good |
| 2 | 425° C. | 15 min | 13543 | 255 MPa | 85 | Good |
| 3 | 500° C. | 5 min | 14629 | 95 MPa | 80 | Very good |
| 4 | 620° C. | 240 min | 18401 | 40 MPa | 70 | Very good |
| 5 | 640° C. | 720 min | 19248 | 15 MPa | 35 | Poor |
| 6 | 700° C. | 2 min | 18026 | 35 MPa | 75 | Large deformation |

No. 1 and No. 2 had high residual stress, but had sufficient good fatigue test results. No. 3 and No. 4 had low residual stress and high surface hardness, so had extremely good fatigue test results. No. 5 has a large tempering parameter and a low residual stress, but also has a low surface hardness. As a result, fatigue cracks are believed to occur earlier. No. 7 has a high annealing temperature and a large deformation before and after the heat treatment, so is judged not able to be used for automobile chassis parts.

EXAMPLE 3

Figure 7:
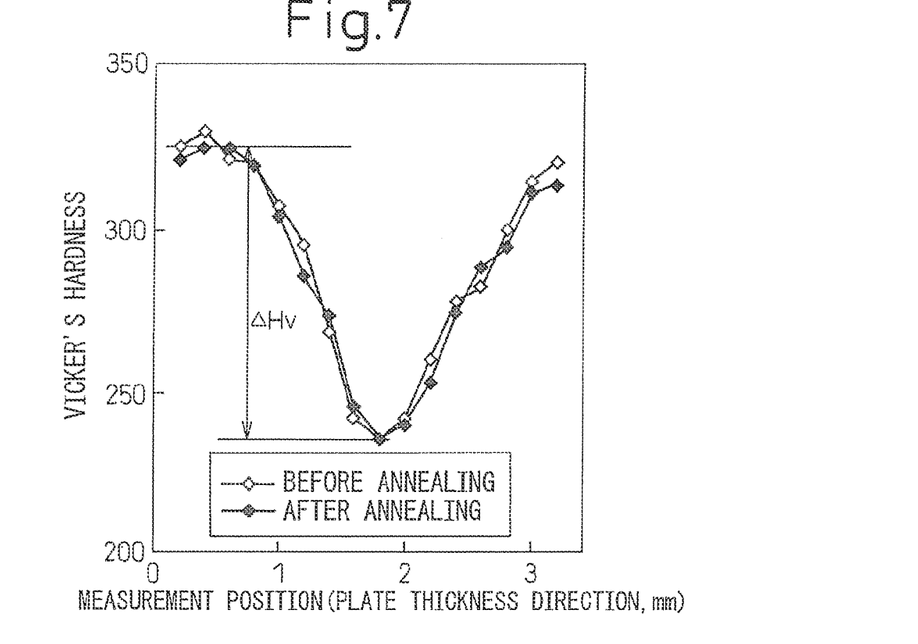
FIG. 7 is a graph showing the Vicker's hardness in the plate thickness direction of 0.03% Nb-0.3% Mo steel in Example 3.
Figure 8:
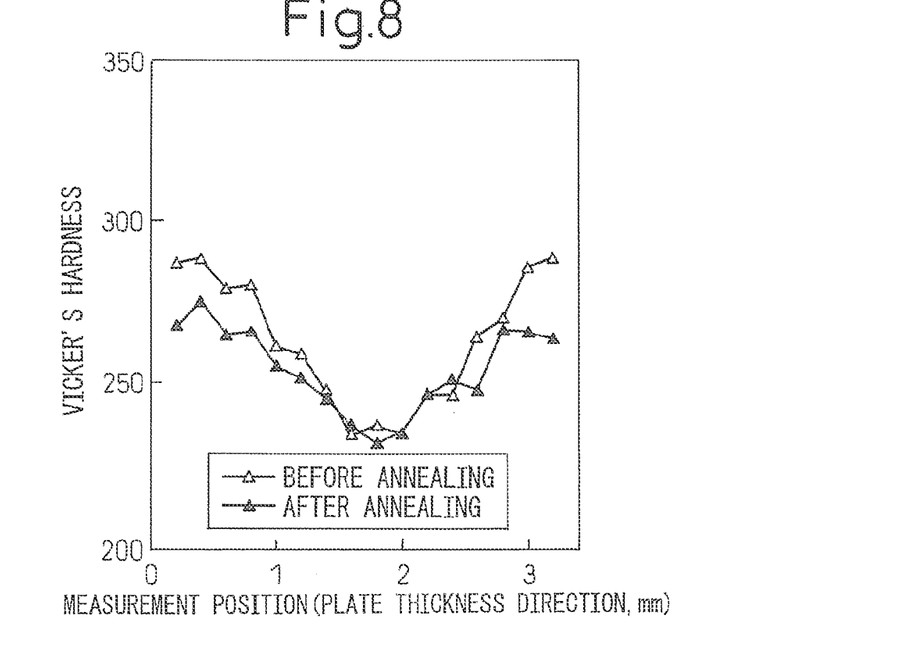
FIG. 8 is a graph showing the Vicker's hardness in the plate thickness direction of 0.05% Nb-0.05% V steel in Example 3.

For (a) 0.03% Nb-0.3% Mo steel and (b) 0.05% Nb-0.05% V steel, steel of a plate thickness of 3.4 mm both bent by a bending outer surface radius of 14 mm and steel bent, then annealed were measured for distribution of hardness in the cross-section of the plate thickness direction. The results are shown in FIG. 7 and FIG. 8. The (a) 0.03% Nb-0.3% Mo steel of the present invention, as shown in FIG. 7, had an extremely high hardness of the surface layer, had a large difference in hardness with the plate thickness center part, and almost no drop in annealing. As opposed to this, the (b) 0.05% Nb-0.05% V steel, as shown in FIG. 8, had a hardness of the plate thickness center part equal to the steel of the present invention, but had a low hardness of the surface layer part and had a large drop in hardness due to annealing as well.

INDUSTRIAL APPLICABILITY

The steel material for automobile chassis parts of the present invention is a steel material to which Nb and Mo have been compositely added. Since the work hardening is large, when bending it with a bending R of the plate outer surface of 2 to 5 times the plate thickness, the hardness near the surface, where the amount of deformation is greater than the plate thickness center, greatly rises. For this reason, the difference between the Vicker's hardness of the plate thickness center and the maximum value of the Vicker's hardness within 0.5 mm from the surface can be enlarged to 50 to 150 points and, as shown by the data of the later explained examples, the fatigue characteristics after shaping and annealing become superior. Further, the center layer has a low hardness, so the workability is good and shaping is possible with a high dimensional accuracy, so the work efficiency of assembly into the chassis is also superior.

In this way, the steel material for automobile chassis parts of the present invention exhibits superior characteristics even without annealing, but does not change in hardness even if annealed to eliminate residual strain. That is, by the precipitation of (Nb,Mo)C due to the heating at the time of annealing of this steel material, the drop in hardness near the surface can be prevented and, even with annealing, the high hardness of before annealing can be maintained. For this reason, the difference between the Vicker's hardness of the center of plate thickness and a maximum value of Vicker's hardness within 0.5 mm from the surface after the above bending, then annealing under conditions giving a tempering parameter λ, defined by λ=T(20+log(t)), of 14000 to 19000 (where T is an absolute temperature, t is a time (h), and the temperature rise is 660° C.) can be made a large 50 to 150 points.

Therefore, the automobile axle beam obtained according to the present invention has a high surface hardness and, as shown in the data of the later explained examples, is superior in fatigue characteristics after shaping and annealing. Further, the center layer has a low hardness, so has a good workability and can be shaped with a high dimensional precision, so the work efficiency in assembly into the chassis is superior. Further, the residual strain can be eliminated by annealing at a low temperature of 660° C. or less, the heat treatment cost becomes inexpensive, there is little drop in hardness even with annealing, the fatigue characteristics are superior, etc. There are many advantages.

What is claimed:

1. A hot-rolled steel material for automobile chassis parts superior in fatigue characteristics, comprising a composition of, by mass %, C: 0.05 to 0.23%, Si: 0.05 to 1.0%, Mn: 0.3 to 2.0%, P: 0.03% or less, S: 0.01% or less, Nb: 0.02 to 0.1%, Mo: 0.2 to 0.5%, Sol. Al: 0.01 to 0.05%, N: 0.006% or less, and a balance of Fe and unavoidable impurities, wherein
a plate of the hot-rolled steel material is press formed to give a cross-sectional bending radius of the plate outer surface of 2 to 5 times the plate thickness such that a Vicker's hardness at a center of a plate thickness is lower than a maximum value of a Vicker's hardness within 0.5 mm of the plate surface by 50 to 150 points, and wherein
the press-formed plate of the hot-rolled steel material is then annealed under conditions giving a tempering parameter λ, defined by λ=T(20+log(t)), of 14000 to 19000 such that (Nb, Mo)C precipitates are produced, where T is absolute temperature, t is time (h), and an increase in temperature during annealing is 660° C.

2. The hot-rolled steel material for automobile chassis parts superior in fatigue characteristics as set forth in claim 1, wherein
the steel material comprises, by mass %, C: 0.05 to 0.23%, Si: 0.05 to 1.0%, Mn: 0.3 to 2.0%, P: 0.03% or less, S: 0.01% or less, Nb: 0.02 to 0.1%, Mo: 0.2 to 0.5%, Sol. Al: 0.01 to 0.05%, N: 0.006% or less, and a balance of Fe and unavoidable impurities.

3. The hot-rolled steel material for automobile chassis parts superior in fatigue characteristics as set forth in claim 1, further comprising at least one of Ti: 0.005 to 0.03%, V: 0.005 to 0.1%, Cr: 0.1 to 0.5%, Cu: 0.001 to 0.5%, Ni: 0.001 to 0.5%, B: 0.0001 to 0.003%, Ca: 0.0001 to 0.003%, and Mg: 0.0001 to 0.004%.

4. The hot-rolled steel material for automobile chassis parts superior in fatigue characteristics as set forth in claim 1, further comprising at least one of Ti: 0.005 to 0.03%, V: 0.005 to 0.1%, Cr: 0.1 to 0.5%, Cu: 0.001 to 0.5%, Ni: 0.001 to 0.5%, B: 0.0001 to 0.003%, Ca: 0.0001 to 0.003%, and Mg: 0.0001 to 0.004%.

5. The hot-rolled steel material for automobile chassis parts superior in fatigue characteristics as set forth in claim 1, wherein the automobile chassis parts have an irregular-section tubular body.

6. The hot-rolled steel material for automobile chassis parts superior in fatigue characteristics as set forth in claim 1, wherein the automobile chassis parts have an irregular-section tubular body.

7. The hot-rolled steel material for automobile chassis parts superior in fatigue characteristics as set forth in claim 2, wherein the automobile chassis parts have an irregular-section tubular body.

8. The hot-rolled steel material for automobile chassis parts superior in fatigue characteristics as set forth in claim 3, wherein the automobile chassis parts have an irregular-section tubular body.

9. The hot-rolled steel material for automobile chassis parts superior in fatigue characteristics as set forth in claim 4, wherein the automobile chassis parts have an irregular-section tubular body.

* * * * *

UNITED STATES PATENT AND TRADEMARK OFFICE
CERTIFICATE OF CORRECTION

PATENT NO. : 8,778,261 B2
APPLICATION NO. : 13/300970
DATED : July 15, 2014
INVENTOR(S) : Hideyuki Nakamura et al.

It is certified that error appears in the above-identified patent and that said Letters Patent is hereby corrected as shown below:

In the Specification

Column 3, line 62, change "forming AN" to -- forming AlN --;

Column 6, line 5, change "The difference AH" to -- The difference $\Delta$H --;

Column 6, line 59, change "the X-ray method, Further" to -- the X-ray method. Further --.

Signed and Sealed this
Twenty-eighth Day of April, 2015

Michelle K. Lee
*Director of the United States Patent and Trademark Office*